(12) United States Patent
Dai et al.

(10) Patent No.: US 12,235,531 B2
(45) Date of Patent: Feb. 25, 2025

(54) GLASS BACKPLANE AND METHOD OF MANUFACTURING THE SAME, AND DISPLAY APPARATUS

(71) Applicants: K-Tronics (Suzhou) Technology Co., Ltd., Jiangsu (CN); BOE TECHNOLOGY GROUP CO., LTD., Beijing (CN)

(72) Inventors: Hailong Dai, Beijing (CN); Yanan Zhang, Beijing (CN)

(73) Assignees: K-Tronics (Suzhou) Technology Co., Ltd., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 1138 days.

(21) Appl. No.: 16/982,030

(22) PCT Filed: Nov. 22, 2019

(86) PCT No.: PCT/CN2019/120149
§ 371 (c)(1),
(2) Date: Sep. 17, 2020

(87) PCT Pub. No.: WO2021/097790
PCT Pub. Date: May 27, 2021

(65) Prior Publication Data
US 2021/0191185 A1 Jun. 24, 2021

(51) Int. Cl.
*G02F 1/1333* (2006.01)
*C03C 17/00* (2006.01)
*C03C 17/34* (2006.01)

(52) U.S. Cl.
CPC ...... *G02F 1/133314* (2021.01); *C03C 17/007* (2013.01); *C03C 17/3405* (2013.01);
(Continued)

(58) Field of Classification Search
CPC ......... G02F 1/133314; G02F 1/133385; G02F 2201/08; G02F 2202/09; G02F 2202/22;
(Continued)

(56) References Cited

U.S. PATENT DOCUMENTS

| 10,402,001 B2 | 9/2019 | Kim et al. |
| 2003/0089275 A1 | 5/2003 | Kawamura et al. |

(Continued)

FOREIGN PATENT DOCUMENTS

| CN | 1553857 A | * 12/2004 | ............. B32B 17/10 |
| CN | 202048507 U | 11/2011 | |

(Continued)

OTHER PUBLICATIONS

Office Action dated Feb. 28, 2024, in Chinese Patent Application No. 201980002540.4.

*Primary Examiner* — Tamra L. Dicus
(74) *Attorney, Agent, or Firm* — Procopio, Cory, Hargreaves & Savitch LLP

(57) ABSTRACT

A glass backplane includes a tempered glass substrate, a light-shielding layer and a reflective layer. Two opposite sides of the tempered glass substrate are a first side and a second side. The light-shielding layer is disposed on the first side of the tempered glass substrate, two opposite sides of the light-shielding layer are a first side and a second side, and the second side of the light-shielding layer is closer to the tempered glass substrate than the first side of the light-shielding layer. The reflective layer is disposed at the first side of the light-shielding layer.

8 Claims, 5 Drawing Sheets

(52) U.S. Cl.
CPC .. *G02F 1/133385* (2013.01); *C03C 2217/445* (2013.01); *C03C 2217/477* (2013.01); *G02F 2201/08* (2013.01); *G02F 2202/09* (2013.01); *G02F 2202/22* (2013.01); *G02F 2203/02* (2013.01)

(58) Field of Classification Search
CPC ........... G02F 2203/02; G02F 1/133308; G02F 1/133334; C03C 17/007; C03C 17/3405; C03C 2217/445; C03C 2217/477; C03C 2217/475; C03C 2217/732
See application file for complete search history.

(56) References Cited

U.S. PATENT DOCUMENTS

| | | | | |
|---|---|---|---|---|
| 2010/0310887 | A1* | 12/2010 | Kim | B32B 17/1011 428/426 |
| 2013/0008500 | A1 | 1/2013 | Lin et al. | |
| 2014/0043546 | A1* | 2/2014 | Yamazaki | G02F 1/13338 349/12 |
| 2014/0308525 | A1* | 10/2014 | Hochrein | C03C 21/002 501/59 |
| 2016/0116646 | A1* | 4/2016 | Araki | G02B 6/0011 349/112 |
| 2018/0182834 | A1* | 6/2018 | Toyotaka | H01L 29/66969 |
| 2021/0223625 | A1 | 7/2021 | Guo et al. | |

FOREIGN PATENT DOCUMENTS

| | | | |
|---|---|---|---|
| CN | 103162238 | A | 6/2013 |
| CN | 105247411 | A | 1/2016 |
| CN | 206112674 | U | 4/2017 |
| CN | 107728379 | A | 2/2018 |
| CN | 108363224 | A | 8/2018 |
| CN | 108535903 | A | 9/2018 |
| CN | 108845459 | A | 11/2018 |
| CN | 109061920 | A | 12/2018 |
| CN | 109164639 | A | 1/2019 |
| CN | 110018585 | A | 7/2019 |
| DE | 102006042538 | A1 | 3/2008 |
| JP | 2016195172 | A * | 11/2016 |
| KR | 1020100113007 | A | 10/2010 |
| KR | 1020110018186 | A | 2/2011 |

* cited by examiner

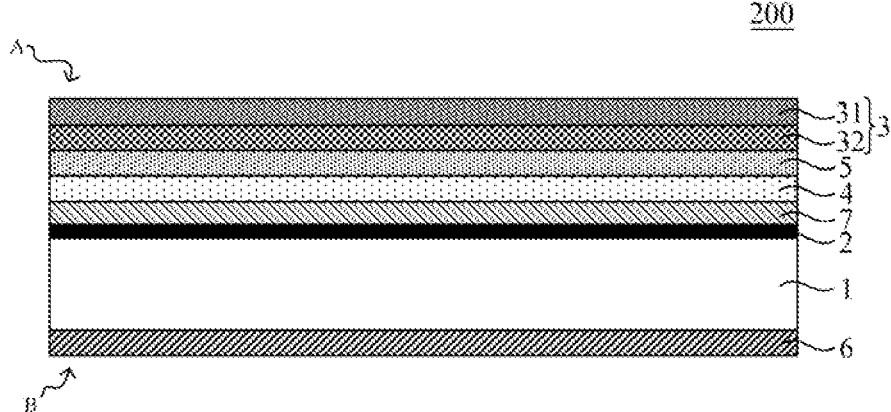

FIG. 5

```
┌─────────────────────────────────────────────┐
│ A glass base is provided, and two opposite  │
│ sides of the glass base are a first side    │── S1
│ and a second side.                          │
└─────────────────────────────────────────────┘
                      ↓
┌─────────────────────────────────────────────┐
│ A light-shielding layer is formed on a      │
│ surface on the first side of the glass. Two │
│ opposite sides of the light-shielding layer │
│ are a first side and a second side, with    │
│ the second side of the light-shielding      │
│ layer being closer to the glass than the    │── S2
│ first side of the light-shielding layer.    │
└─────────────────────────────────────────────┘
                      ↓
┌─────────────────────────────────────────────┐
│ The glass base with the light-shielding     │
│ layer formed thereon is tempered, so as to  │── S3
│ transform the glass base into a tempered    │
│ glass substrate.                            │
└─────────────────────────────────────────────┘
                      ↓
┌─────────────────────────────────────────────┐
│ A reflective layer is formed at the first   │── S4
│ side of the light-shielding layer.          │
└─────────────────────────────────────────────┘
```

FIG. 6

GLASS BACKPLANE AND METHOD OF MANUFACTURING THE SAME, AND DISPLAY APPARATUS

CROSS-REFERENCE TO RELATED APPLICATION

This application is a national phase entry under 35 USC 371 of International Patent Application No. PCT/CN2019/120149 filed on 22 Nov. 2019, which is incorporated herein by reference in its entirety.

TECHNICAL FIELD

The present disclosure relates to the field of display technologies, and in particular, to a glass backplane and a method of manufacturing the same, and a display apparatus.

BACKGROUND

In a liquid crystal display device, a backplane is an important component. Compared with a metal backplane, a glass backplane has advantages of being good in flatness, light and thin, fashionable, anti-glare, good in weather resistance, free of mold opening and the like, and thus becomes one of choices of the backplane in the liquid crystal display device. However, since glass itself has disadvantages of fragility, poor impact resistance, light transmission and the like, the glass backplane cannot be widely used in the liquid crystal display device.

SUMMARY

In an aspect, a glass backplane including a tempered glass substrate, a light-shielding layer and a reflective layer is provided. Two opposite sides of the tempered glass substrate are a first side and a second side. The light-shielding layer is disposed on the first side of the tempered glass substrate, two opposite sides of the light-shielding layer are a first side and a second side, and the second side of the light-shielding layer is closer to the tempered glass substrate than the first side of the light-shielding layer. The reflective layer is disposed at the first side of the light-shielding layer.

In some embodiments, a material of the light-shielding layer is ink.

In some embodiments, the reflective layer includes a first sub-layer and a second sub-layer that are stacked, and the second sub-layer is closer to the light-shielding layer than the first sub-layer. The first sub-layer includes reflective particles.

In some embodiments, a material of the second sub-layer is polyethylene glycol terephthalate.

In some embodiments, a material of the reflective particles includes at least one of titanium dioxide, zinc oxide and zirconium oxide. The first sub-layer further includes a base, the reflective particles are dispersed in the base, and a material of the base includes at least one of acrylic resin and polymethyl methacrylate.

In some embodiments, the glass backplane further includes a heat-dissipating layer disposed between the light-shielding layer and the reflective layer.

In some embodiments, a material of the heat-dissipating layer includes at least one of graphite, copper, aluminum and silver.

In some embodiments, the glass backplane further includes a destaticizing layer disposed between the light-shielding layer and the reflective layer.

In some embodiments, a material of the destaticizing layer is a metal.

In some embodiments, the glass backplane further includes a wear-resistant layer disposed on the second side of the tempered glass substrate.

In some embodiments, a material of the wear-resistant layer is polyethylene glycol terephthalate.

In some embodiments, the glass backplane further includes an adhesive layer disposed between the light-shielding layer and the reflective layer.

In some embodiments, a thickness of the light-shielding layer is greater than or equal to 29.5 μm, and is less than or equal to 30.5 μm.

In another aspect, a method of manufacturing a glass backplane is provided. The method includes: providing a glass base, two opposite sides of the glass base being a first side and a second side; forming a light-shielding layer on a surface of the first side of the glass base, two opposite sides of the light-shielding layer being a first side and a second side, and the second side of the light-shielding layer being closer to the glass base than the first side of the light-shielding layer tempering the glass base with the light-shielding layer formed thereon, so as to transform the glass base into a tempered glass substrate; and forming a reflective layer at the first side of the light-shielding layer.

In some embodiments, a step of forming the reflective layer at the first side of the light-shielding layer includes: forming a second sub-layer at the first side of the light-shielding layer, two opposite sides of the second sub-layer being a first side and a second side, and the second side of the second sub-layer being closer to the light-shielding layer than the first side of the second sub-layer; and forming a first sub-layer on a surface of the first side of the second sub-layer, the first sub-layer including a base and reflective particles dispersed in the base.

In some embodiments, a step of forming the reflective layer at the first side of the light-shielding layer includes: providing a second sub-layer, two opposite sides of the second sub-layer being a first side and a second side; forming a first sub-layer on a surface of the first side of the second sub-layer, the first sub-layer including a base and reflective particles dispersed in the base; bonding the reflective layer composed of the first sub-layer and the second sub-layer to a surface of the first side of the light-shielding layer through an adhesive, the second side of the second sub-layer being closer to the light-shielding layer than the first side of the second sub-layer.

In yet another aspect, a display apparatus including the above glass backplane is provided.

BRIEF DESCRIPTION OF THE DRAWINGS

In order to describe technical solutions in the present disclosure more clearly, accompanying drawings to be used in some embodiments of the present disclosure will be introduced briefly. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, an actual process of a method and actual timings of signals that the embodiments of the present disclosure relate to.

FIG. 18 is diagram showing a structure of another backlight module, in accordance with some embodiments of the related art;

FIG. 5 is a diagram showing a structure of yet another glass backplane, in accordance with some embodiments of the present disclosure;

FIG. 6 is a flow diagram of a method of manufacturing a glass backplane, in accordance with some embodiments of the present disclosure;

DETAILED DESCRIPTION

Technical solutions in some embodiments of the present disclosure will be described clearly and completely in combination with accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to same embodiment(s) or example(s). In addition, the specific features, structures, materials or characteristics may be included in any one or more embodiments or examples in any suitable manner.

The phrase "at least one of A, B, and C" has a same meaning as the phrase "at least one of A, B, or C", and both include the following combinations of A, B, and C; only A, only B, only C, a combination of A and B, a combination of A and C, a combination of B and C, and a combination of A, B, and C.

A liquid crystal display device includes a backlight module and a display panel that are stacked. The backlight module is disposed on a back side of the display panel (i.e., a side opposite to a display surface side of the display panel), and the backlight module is configured to provide light to the display panel, so that the display panel may display an image.

Figure 1A:
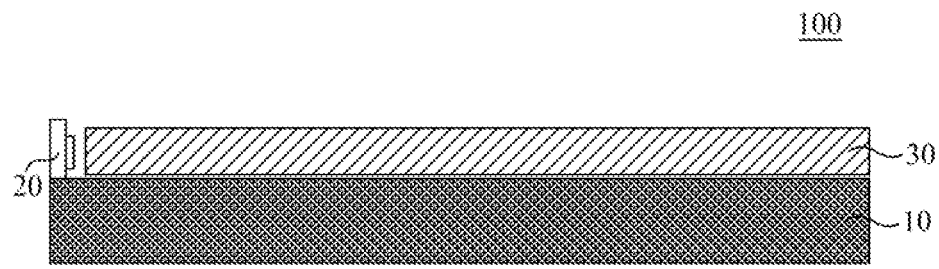
FIG. 1A is a diagram showing a structure of a backlight module, in accordance with some embodiments of the related art.
Figure 1B:
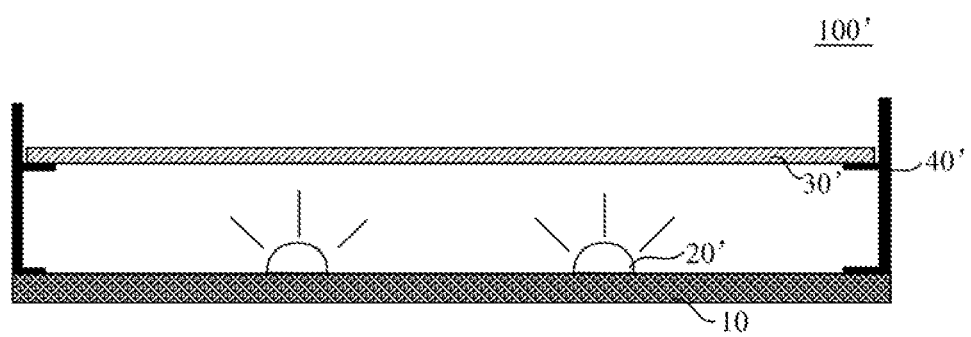
Figure 2A:
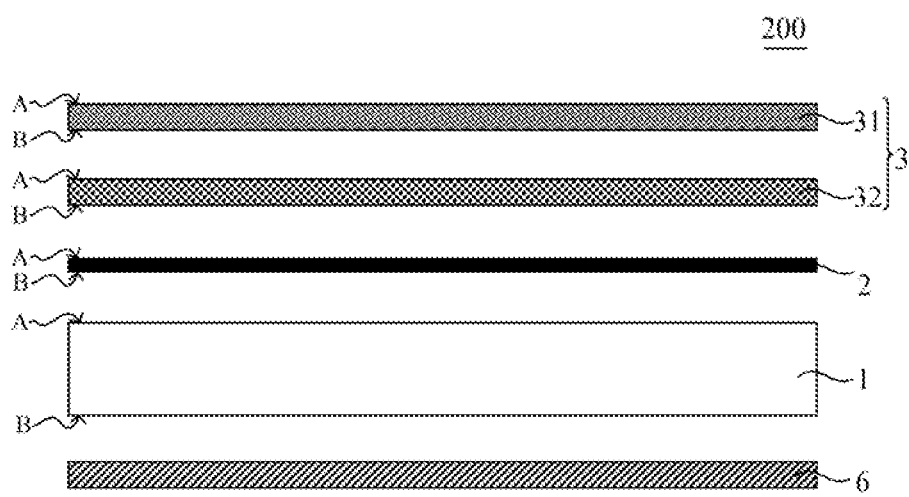
FIG. 2A is an exploded diagram of a glass backplane, in accordance with some embodiments of the present disclosure.
Figure 2B:
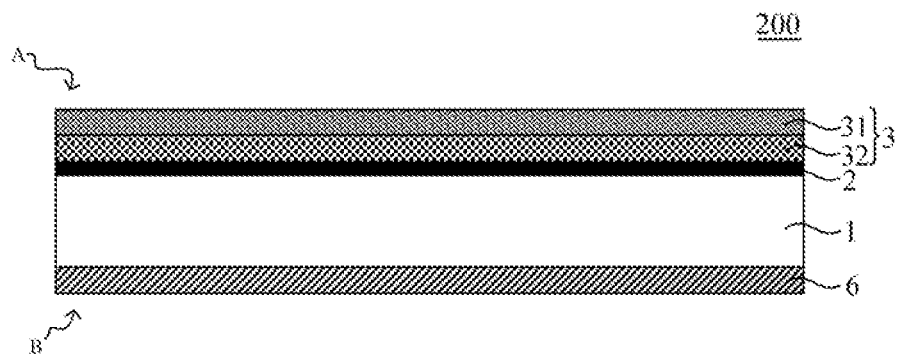
FIG. 2B is a diagram showing a structure of another glass backplane, in accordance with some embodiments of the present disclosure.

As shown in FIGS. 1 and 1B, according to different arrangements of a light source, the backlight module mainly includes a side-type backlight module and a direct-type backlight module.

As shown in FIG. 1A, for example, the side-type backlight module 100 includes a backplane 10, a light source 20 and a light guide plate 30. The light source 20 is disposed at an end of the light guide plate 30, and the backplane 10 is disposed on a side of the light guide plate 30 configured to face away from the display panel.

A process of providing light by the side-type backlight module 100 is roughly as follows. The light source 20 emits light, and the light enters an interior of the light guide plate 30 from an end of the light guide plate 30 and exits from a side of the light guide plate 30 facing away from the backplane 10 after being guided by the light guide plate 30, thereby providing required backlight for the display panel.

In some cases, the side-type backlight module 100 further includes a reflective plate 40 capable of re-reflecting light emitted from a side of the light guide plate 30 facing the backplane 10 back to the interior of the light guide plate 30, thereby improving a utilization rate of the light.

In the side-type backlight module 100, the backplane 10 is configured to support and protect the light guide plate 30. In a case where no reflective plate 40 is disposed between the backplane 10 and the light guide plate 30, the backplane 10 may further have a reflective function, i.e., re-reflect the light emitted from the side of the light guide plate 30 facing the backplane 10 back to the interior of the light guide plate 30.

As shown in FIG. 1B, the direct-type backlight module 100' includes a backplane 10, a light source 20' and a diffusion plate 30'. The light source 20' is disposed on a side of the backplane 10 facing the diffusion plate 30', and the backplane 10 is disposed at a side of the light guide plate 30' configured to face away from the display panel.

A process of providing light by the direct-type backlight module 100' is roughly as follows. The light source 20' emits light, and the light enters the diffusion plate 30' and exits from a side of the diffusion plate 30' facing away from the backplane 10' after being uniformly dispersed by the diffusion plate 30', thereby providing required backlight for the display panel.

In the direct-type backlight module 100', the backplane 10 is configured to support and protect the light source 20', and the backplane 10 further has a reflective function, i.e., reflect light emitted by the light source 20' and directed to the backplane 10 to the diffusion plate 30'.

In some embodiments, the backplane included in the backlight module is a metal backplane, which has disadvantages of easy deformation, easy expansion when heated, complex structure, high mold opening cost and the like. Compared with the metal backplane, a glass backplane has advantages of being good in flatness, light and thin, anti-glare, good in weather resistance, free of mold opening and the like, and thus becomes one of choices of the backplane in the backlight module. However, since glass itself has disadvantages of fragility, poor impact resistance, light transmission and the like, a wide application of the glass backplane in the liquid crystal display device is limited.

On this basis, as shown in FIGS. 2A to 5, some embodiments of the present disclosure provide a glass backplane. For ease of description of relative positions of a plurality of film layers included in the glass backplane 200, reference is made to FIG. 2A, where two opposite sides of each film layer are a first side A and a second side B. In FIGS. 2B to 5, the two opposite sides of each film layer included in the glass backplane 200 are the same as those in FIG. 2A.

The glass backplane 200 includes a tempered glass substrate 1, a light-shielding layer 2 and a reflective layer 3.

The tempered glass substrate 1 is obtained by tempering a glass base. Compared with a common glass substrate, the tempered glass substrate has a stronger impact resistance and thermal stability, stronger carrying capacity, and is not easy to break with higher safety.

In some embodiments, the glass base used to manufacture the tempered glass substrate 1 is obtained by cutting float glass, such as low-iron float glass. The float glass has advantages of good transparency, free of glass furuncles and bubbles, good optical performance, good flatness, compact structure, being not easy to break and the like. The float glass is selected and made to be a glass base and tempered to obtain the tempered glass substrate 1, which may improve flatness of the backplane 200 and further improve impact resistance of the glass backplane 200.

Referring to FIGS. 2A to 5, two opposite sides of the tempered glass substrate 1 are a first side A and a second side B. In a case where the glass backplane 200 is applied to a backlight module, the first side A of the tempered glass substrate 1 is closer to a light source in the backlight module than the second side B.

The light-shielding layer 2 is disposed on a surface of the first side A of the tempered glass substrate 1, two opposite sides of the light-shielding layer 2 are a first side A and a second side B, and the second side B of the light-shielding layer 2 is closer to the tempered glass substrate 1 than the first side A of the light-shielding layer 2. The light-shielding layer 2 is configured to reduce light transmittance of the tempered glass substrate 1 and prevent light from passing through the tempered glass substrate 1.

The reflective layer 3 is disposed at the first side A of the light-shielding layer, and is configured to reflect light to improve light reflection performance of the glass backplane 200.

The glass backplane 200 provided in the embodiments of the present disclosure includes the tempered glass substrate 1, the light-shielding layer 2 and the reflective layer 3 that are stacked successively. The tempered glass substrate 1 itself has strong impact resistance and high carrying capacity. The light-shielding layer 2 is disposed on a side of the tempered glass substrate 1, and is capable of reducing the light transmittance of the tempered glass substrate 1. The reflective layer 3 is disposed at a side of light-shielding layer 2 facing away from the tempered glass substrate 1, and is capable of reflecting light. In this way, when light is directed to the glass backplane 200, the light is reflected under action of the reflective layer 3 and exits in a direction away from the glass backplane 200. Moreover, the light cannot pass through the light-shielding layer 2 to reach the tempered glass substrate 1 under action of the light-shielding layer 2. Therefore, problems of poor impact resistance and light transmission of the glass are solved, and the glass backplane 200 is with an improved impact resistance, is not easy to break, has excellent deformation resistance and is less affected by environment (e.g., temperature changes and humidity changes). That is to say, the glass backplane 200 provided in the embodiments of the present disclosure further has strong deformation resistance, low light transmittance and certain light reflection performance with advantages of being good in the flatness, good in the weather resistance, not easy to expand and deform, light and thin, free of the mold opening and the like.

A position of the light-shielding layer 2 and a position of the reflective layer 3 in the glass backplane 200 provided by the present disclosure are not limited to the ones in the above arrangements. In some other embodiments, the light-shielding layer 2 and the reflective layer 3 may further be disposed at other positions. For example, the light-shielding layer 2 is disposed on the second side B of the tempered glass substrate 1, and the reflective layer 3 is disposed at the first side A of the tempered glass substrate 1. For example, the light-shielding layer 2 is disposed on the second side B of the tempered glass substrate 1, with the first side A of the light-shielding layer 2 being closer to the tempered glass substrate 1 than the second side B of the light-shielding layer 2, and the reflective layer 3 is disposed at the second side B of the light-shielding layer 2.

In some embodiments, a material of the light-shielding layer 2 is not limited, as long as the material is capable of shielding light. For example, the material of the light-shielding layer 2 is ink, a black color resistor, a black light-absorbing film, or the like.

In some examples, the material of the light-shielding layer 2 is high-temperature ink. For example, the high-temperature ink is capable of withstanding a temperature in a range of 500° C. to 850° C. Compared with low-temperature ink, the high-temperature ink has characteristics such as a higher adhesive force and stronger weather resistance, and has a higher hiding power. By selecting the high-temperature ink as the material of light-shielding layer 2, the light-shielding layer 2 may be firmly adhered to a surface of the tempered glass substrate 1, and corrosion resistance of the light-shielding layer 2 may be improved.

In some examples, in a case where the light-shielding layer 2 is disposed on the surface of the first side A of the tempered glass substrate 1, and the material of the light-shielding layer 2 is the high-temperature ink, a method of manufacturing the glass backplane 200 provided by the present disclosure is as follows. After the light-shielding layer 2 is formed on a surface of a first side A of the glass base, the glass base with the light-shielding layer 2 formed thereon is tempered, so as to transform the glass base into a tempered glass substrate 1. In a process of tempering the glass base with the light-shielding layer 2 formed thereon, a simultaneous heating and then a drastical temperature reducing are required to be made to the glass base and the light-shielding layer 2, and with the high-temperature ink being selected as the material of the light-shielding layer 2 due to its characteristics such as high adhesive force and strong weather resistance, it is possible to avoid phenomena of falling off and fading of the light-shielding layer 2 caused by an insufficient adhesive force and unstable performance of the material of the light-shielding layer 2 in the heating process. After the glass base with the light-shielding layer 2 being formed thereon is tempered, the high-temperature ink may be in closer contact with the surface of the tempered glass substrate 1. Therefore, the light-shielding layer 2 is closely attached to the surface of the tempered glass substrate 1 and is not easy to fall off.

In some embodiments, by setting a thickness of the light-shielding layer 2 within an appropriate range, it is possible to avoid that the glass backplane 200 is not light and thin enough due to a fact that an overall thickness of the glass backplane 200 is increased due to an excessively large thickness of the light-shielding layer 2, and it is further possible to avoid that a light transmission phenomenon of the glass backplane 200 cannot be effectively improved due to a fact that light-shielding performance of the light-shielding layer 2 for the tempered glass substrate 1 is insufficient due to an excessively small thickness of the light-shielding layer 2.

For example, the thickness of the light-shielding layer is greater than or equal to 29.5 μm, and is less than or equal to 30.5 μm. In this way, not only is it possible to ensure that the light-shielding layer 2 is capable of effectively improving the light transmission phenomenon of the glass backplane 200, but also it is possible to ensure that the glass backplane 200 is light and thin. For example, the thickness of the light-shielding layer 2 is 29.5 μm, or the thickness of the light-shielding layer 2 is 30 μm, or the thickness of the light-shielding layer 2 is 30.5 μm.

In some embodiments, the thickness of the light-shielding layer 2 is related to the material thereof. For example, in the case where the material of the light-shielding layer 2 is the high-temperature ink, the thickness of the light-shielding layer 2 is greater than or equal to 29.5 μm, and is less than or equal to 30.5 μm. In this way, not only is it possible to ensure that the light-shielding layer 2 is capable of effectively improving the light transmission phenomenon of the glass backplane 200, but also it is possible to ensure that the glass backplane 200 is light and thin. For example, the thickness of the light-shielding layer 2 is 29.5 μm, or the thickness of the light-shielding layer 2 is 30 μm, or the thickness of the light-shielding layer 2 is 30.5 μm.

In some embodiments, as shown in FIGS. 2A to 5, the reflective layer 3 includes a first sub-layer 31 disposed at the first side A of the light-shielding layer 2. The first sub-layer 31 includes a base and reflective particles, and the reflective particles are dispersed in the base, and are configured to reflect light.

In the above embodiments, the reflective layer 3 includes the first sub-layer 31. The reflective particles included in the first sub-layer 31 are configured to reflect the light, and the base serves as a matrix for carrying the reflective particles, so that the reflective particles may be dispersed in the base and form a film layer, which is disposed in the glass backplane 200, together with the base. In this way, when the light is incident on the glass backplane 200, the light is reflected under reflection action of the first sub-layer 31, and exits in the direction away from the glass backplane 200, thereby effectively preventing the light from passing through the tempered glass substrate 1 and improving the utilization rate of the light.

In some embodiments, a material of the base in the first sub-layer 31 is not limited, as long as the material is capable of carrying the reflective particles. For example, the material of the base includes at least one of acrylic resin, polymethyl methacrylate and polyethylene glycol terephthalate (PET). Acrylic resin, polymethyl methacrylate and PET all have characteristics of transparency, good wear resistance, good weather resistance, no toxicity and the like. By using these materials as the material of the base, the reflective particles may be dispersed therein, the reflective particles may be carried, and light reflection performance of the reflective particles is not affected.

In some embodiments, a material of the reflective particles in the first sub-layer 31 is not limited, as long as the material is capable of reflecting light. For example, the material of the reflective particles includes at least one of titanium dioxide, zinc oxide and zirconium oxide. Titanium dioxide, zinc oxide and zirconium oxide all have strong light reflection performance. Therefore, by dispersing the reflective particles in the base, the light directed to the glass backplane 200 may be effectively reflected.

A specific composition of the first sub-layer 31 may be any combination of the material included in the base and the material included in the reflective particles. For example, the composition of the first sub-layer 31 is that acrylic resin is used as the base, and titanium dioxide particles are dispersed in the acrylic resin. Or, the composition of the first sub-layer 31 is that acrylic resin is used as the base, and titanium dioxide particles and zinc oxide particles are dispersed in the acrylic resin. Or, a mixture of acrylic resin and polymethyl methacrylate is used as the substrate, and titanium dioxide particles, zinc oxide particles and zirconium oxide particles are uniformly dispersed in the mixture.

In some embodiments, by setting a thickness of the first sub-layer 31 within an appropriate range, it is possible to avoid that the glass backplane 200 is not light and thin enough due to a fact that the overall thickness of the glass backplane 200 is increased due to an excessively large thickness of the first sub-layer 31, and it is further possible to avoid that the first sub-layer 31 is incapable of reflecting light effectively due to an excessively small thickness of the first sub-layer 31.

For example, the thickness of the first sub-layer 31 is greater than or equal to 50 μm, and is less than or equal to 100 μm. In this way, not only is it possible to ensure that the first sub-layer 31 is capable of effectively reflecting light, but also it is possible to ensure that the glass backplane 200 is light and thin. For example, the thickness of the first sub-layer 31 is 60 μm, or the thickness of the first sub-layer 31 is 80 μm, or the thickness of the first sub-layer 31 is 100 μm.

In some embodiments, the thickness of the first sub-layer 31 is related to the material included in the base and the material included in the reflective particles in the first sub-layer 31. In a case where the material of the base in the first sub-layer 31 includes at least one of acrylic resin, polymethyl methacrylate and PET, and the material of the reflective particles includes at least one of titanium dioxide, zinc oxide and zirconium oxide, the thickness of the first sub-layer 31 is greater than or equal to 50 μm, and is less than or equal to 100 μm. In this way, not only is it possible to ensure that the first sub-layer 31 is capable of effectively reflecting light, but also it is possible to ensure that the glass backplane 200 is light and thin. For example, the thickness of the first sub-layer 31 is 60 μm, or the thickness of the first sub-layer 31 is 80 μm, or the thickness of the first sub-layer 31 is 100 μm.

In some embodiments, as shown in FIGS. 2A to 5, the reflective layer 3 further includes a second sub-layer 32 stacked with the first sub-layer 31. In a case where the reflective layer 3 is disposed at the first side A of the tempered glass substrate 1, the second sub-layer 32 is closer to the tempered glass substrate 1 than the first sub-layer 31.

By providing the second sub-layer 32, stiffness of the first sub-layer 31 may be improved, and thus the first sub-layer 31 is not easy to deform, and the impact resistance of the glass backplane 200 may be further improved.

In some embodiments, a material of the second sub-layer 32 is not limited, as long as the material is capable of improving the stiffness of the first sub-layer 31 and further improving the impact resistance of the glass backplane 200.

For example, the material of the second sub-layer 32 has high mechanical strength and high hardness.

In some examples, the material of the second sub-layer 32 is one of PET, polypropylene (PP) and polyvinyl chloride (PVC). For example, the material of the second sub-layer 32 is PET. PET, PP and PVC all have strong mechanical properties, high surface hardness and good heat resistance. By using one of the materials as the material of the second sub-layer 32, the obtained second sub-layer 32 has higher hardness and good impact resistance, thereby providing an effective support for the first sub-layer 31 and improving the stiffness of the first sub-layer 31. Moreover, the second sub-layer 32 may further strengthen the impact resistance and tear resistance of the tempered glass substrate 1, and prevent the tempered glass substrate 1 from bursting and scattering.

In some embodiments, in a case where the material of the base in the first sub-layer 31 is PET, and the material of the second sub-layer 32 is PET, the base of the first sub-layer 31 is integrated with the second sub-layer 32.

In some embodiments, by setting a thickness of the second sub-layer 32 within an appropriate range, it is possible to avoid that the glass backplane 200 is not light and thin enough due to a fact that the overall thickness of the glass backplane 200 is increased due to an excessively large thickness of the second sub-layer 32, and it is further possible to avoid an insufficient support for the first sub-layer 31 due to an excessively small thickness of the second sub-layer 32.

For example, the thickness of the second sub-layer 32 is greater than or equal to 30 μm, and is less than or equal to 150 μm. In this way, not only is it possible to ensure that the second sub-layer 32 is capable of effectively supporting the first sub-layer 31, but also it is possible to ensure that the glass backplane 200 is light and thin. For example, the thickness of the second sub-layer 32 is 60 μm, or the thickness of the second sub-layer 32 is 70 μm, or the thickness of the second sub-layer 32 is 80 μm.

In some embodiments, the thickness of the second sub-layer 32 is related to the material thereof. In a case where the material of the second sub-layer 32 is PET, the thickness of the second sub-layer 32 is greater than or equal to 30 μm, and is less than or equal to 150 μm. In this way, not only is it possible to ensure that the second sub-layer 32 is capable of effectively supporting the first sub-layer 31, but also it is possible to ensure that the glass backplane 200 is light and thin. For example, the thickness of the second sub-layer 32 is 60 μm, or the thickness of the second sub-layer 32 is 70 μm, or the thickness of the second sub-layer 32 is 80 μm.

It will be noted that, positions of the first sub-layer 31 and the second sub-layer 32 included in the reflective layer 3 are not limited to the above arrangements. In some other embodiments, the first sub-layer 31 and the second sub-layer 32 in the reflective layer 3 may further be disposed at other positions.

Figure 3:
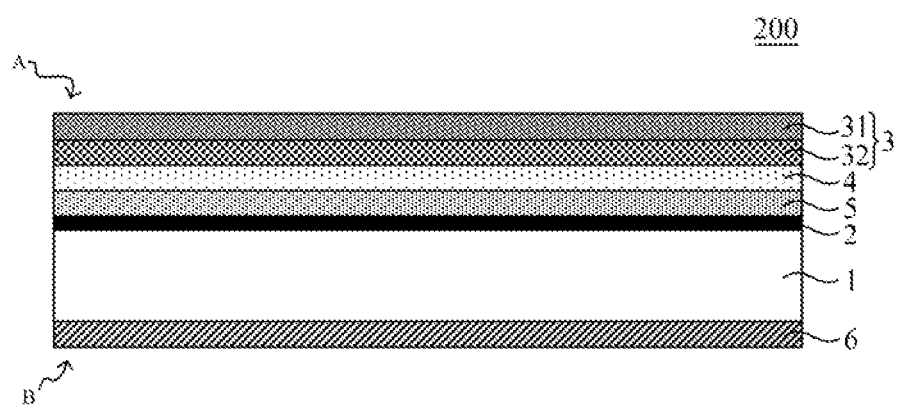
FIG. 3 is a diagram showing a structure of yet another glass backplane, in accordance with some embodiments of the present disclosure.
Figure 4:
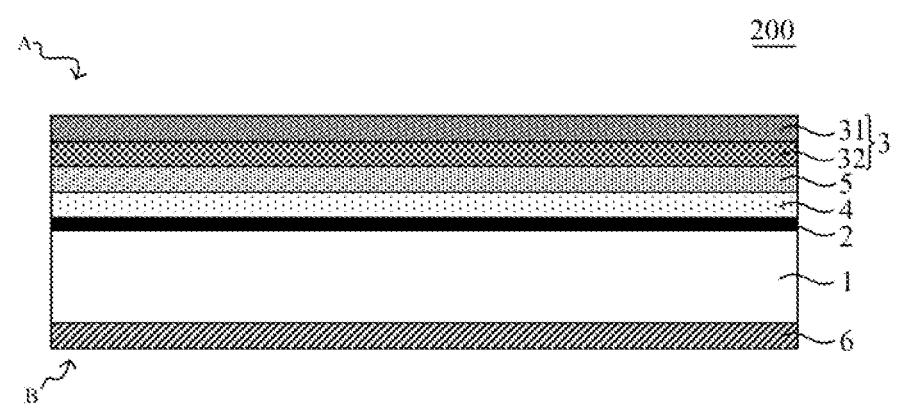
FIG. 4 is a diagram showing a structure of yet another glass backplane, in accordance with some embodiments of the present disclosure.

In some embodiments, as shown in FIGS. 3 to 5, the glass backplane 200 further includes a heat-dissipating layer 4. In a case where the light-shielding layer 2 is disposed on the first side A of the tempered glass substrate 1, and the reflective layer 3 is disposed at the first side A of the light-shielding layer 2, the heat-dissipating layer 4 is disposed between the light-shielding layer 2 and the reflective layer 3. The heat-dissipating layer 4 is capable of conducting and dissipating heat. Therefore, in the case where the glass backplane 200 is applied to the backlight module, heat generated by the backlight module in a working process may be effectively dissipated, thereby preventing an excessively high temperature of the backlight module from affecting its normal operations.

In some embodiments, a material of the heat-dissipating layer 4 is not limited, as long as the material is capable of dissipating heat. For example, the material of the heat-dissipating layer 4 is a material with a high thermal conductivity.

In some embodiments, the material of the heat-dissipating layer 4 includes at least one of graphite, copper, aluminum and silver. Graphite, copper, aluminum and silver have high specific heat capacity and good thermal conductivity, and are fast in heat dissipation and absorption. Therefore, heat-dissipating performance of the heat-dissipating layer 4 may be ensured, and the heat-dissipating layer 4 is capable of conducting and dissipating heat quickly and effectively. For example, the material of the heat-dissipating layer 4 is graphite, or the material of the heat-dissipating layer 4 is silver, or the material of the heat-dissipating layer 4 is an alloy of copper and silver.

In some embodiments, by setting a thickness of the heat-dissipating layer 4 within an appropriate range, it is possible to avoid that the glass backplane 200 is not light and thin enough due to a fact that the overall thickness of the glass backplane 200 is increased due to an excessively large thickness of the heat-dissipating layer 4, and it is further possible to avoid an ineffective heat conduction and dissipation caused by an excessively small thickness of the heat-dissipating layer 4.

For example, the thickness of the heat-dissipating layer 4 is greater than or equal to 50 μm, and is less than or equal to 100 μm. In this way, not only is it possible to ensure that the heat-dissipating layer 4 is capable of effectively conducting and dissipating heat, but also it is possible to ensure that the glass backplane 200 is light and thin. For example, the thickness of the heat-dissipating layer 4 is 60 μm, or the thickness of the heat-dissipating layer 4 is 80 μm, or the thickness of the heat-dissipating layer 4 is 100 μm.

In some embodiments, the thickness of the heat-dissipating layer 4 is related to the material of the heat-dissipating layer 4. In a case where the material of the heat-dissipating layer 4 includes at least one of graphite, copper, aluminum and silver, for example, in a case where the material of the heat-dissipating layer 4 is graphite, the thickness of the heat-dissipating layer 4 is greater than or equal to 50 μm, and is less than or equal to 100 μm. In this way, not only is it possible to ensure that the heat-dissipating layer 4 is capable of effectively conducting and dissipating heat, but also it is possible to ensure that the glass backplane 200 is light and thin. For example, the thickness of the heat-dissipating layer 4 is 60 μm, or the thickness of the heat-dissipating layer 4 is 80 μm, or the thickness of the heat-dissipating layer 4 is 100 μm.

In some embodiments, a position of the heat-dissipating layer 4 in the glass backplane 200 provided by the present disclosure is not limited to the above arrangement. In some other embodiments, the heat-dissipating layer 4 may further be disposed at other positions. For example, the heat-dissipating layer 4 is disposed at the second side B of the tempered glass substrate 1.

In some embodiments, as shown in FIGS. 3 to 5, the glass backplane 200 further includes a destaticizing layer 5. In a case where the light-shielding layer 2 is disposed on the first side A of the tempered glass substrate 1, and the reflective layer 3 is disposed at the first side A of the light-shielding layer 2, the destaticizing layer 5 is disposed between the light-shielding layer 2 and the reflective layer 3.

In some examples, in a case where the glass backplane 200 includes the heat-dissipating layer 4, the heat-dissipating layer 4 and the destaticizing layer 5 are both disposed between the light-shielding layer 2 and the reflective layer 3, and relative positions of the heat-dissipating layer 4 and the destaticizing layer 5 are not limited. For example, as shown in FIG. 3, the destaticizing layer 5 is closer to the light-shielding layer 2 than the heat-dissipating layer 4, or, as shown in FIG. 4, the destaticizing layer 5 is further away from the light-shielding layer 2 than the heat-dissipating layer 4.

In a case where the glass backplane 200 is applied to the backlight module, and the backlight module and a display panel are applied to a display apparatus, the display panel may generate static electricity during operation of the display apparatus, thereby affecting normal operations of the display panel. The destaticizing layer 5 is capable of conducting out the static electricity generated by the display panel, thereby preventing the static electricity from affecting the normal operation of the display panel.

In some embodiments, a material of the destaticizing layer 5 is not limited, as long as the material has strong conductivity and is capable of removing static electricity. For example, the material of the destaticizing layer 5 is a metal. For example, the material of the electrostatic layer 5 includes at least one of copper, silver and aluminum. Copper, silver and aluminum all have high conductivity, and are capable of conducting out static electricity and removing static electricity.

In some embodiments, by setting a thickness of the destaticizing layer 5 within an appropriate range, it is possible to avoid that the glass backplane 200 is not light and thin enough due to a fact that the overall thickness of the glass backplane 200 is increased due to an excessively large thickness of the destaticizing layer 5, and it is further possible to avoid that the destaticizing layer 5 is incapable of effectively removing static electricity due to an excessively small thickness of the destaticizing layer 5.

For example, the thickness of the destaticizing layer 5 is greater than or equal to 2 μm, and is less than or equal to 6 μm. In this way, not only is it possible to ensure that the destaticizing layer 5 is capable of effectively removing ions, but also it is possible to ensure that the glass backplane 200 is light and thin. For example, the thickness of the destaticizing layer 5 is 2 μm, or the thickness of the destaticizing layer 5 is 4 μm, or the thickness of the destaticizing layer 5 is 6 μm.

In some embodiments, the thickness of the destaticizing layer 5 is related to the material thereof. In a case where the material of the destaticizing layer 5 is copper, the thickness of the destaticizing layer 5 is greater than or equal to 2 μm, and is less than or equal to 6 μm. In this way, not only is it possible to ensure that the destaticizing layer 5 is capable of effectively removing the ions, but also it is possible to ensure that the glass backplane 200 is light and thin. For example, the thickness of the destaticizing layer 5 is 2 μm, or the thickness of the destaticizing layer 5 is 4 μm, or the thickness of the destaticizing layer 5 is 6 μm.

In some embodiments, a position of the destaticizing layer 5 in the glass backplane 200 provided by the present disclosure is not limited to the above arrangement. In some other embodiments, the destaticizing layer 5 may further be disposed at other positions. For example, in the case where the reflective layer 3 is disposed at the first side A of the tempered glass substrate 1, the destaticizing layer 5 is disposed at a side of the reflective layer 3 facing away from the tempered glass substrate 1. Or, the destaticizing layer 5 is disposed at the second side B of the tempered glass substrate 1.

In some embodiments, as shown in FIGS. 3 to 5, the glass backplane 200 further includes a wear-resistant layer 6 disposed on the second side B of the tempered glass substrate 1.

The wear-resistant layer 6 is disposed on the second side B of the tempered glass substrate 1, so as to be capable of protecting a surface of the second side B of the tempered glass substrate 1 from being damaged. For example, the wear-resistant layer 6 is capable of preventing the surface of the tempered glass substrate 1 from scratching, and preventing fingerprints from being made on the surface of the tempered glass substrate 1, thereby ensuring an aesthetic appearance of the glass backplane 200.

In some embodiments, a material of the wear layer 6 is not limited, as long as the material is capable of protecting the tempered glass substrate 1. For example, the material of the wear-resistant layer 6 has high friction resistance.

In some examples, the material of the wear layer 6 includes one of PET, PP and PVC. For example, the material of the wear layer 6 includes PET. PET, PP and PVC all have good friction resistance and strong mechanical properties. By using one of the materials as the material of the wear-resistant layer 6, it is possible to ensure that the wear-resistant layer 6 has good friction resistance and high mechanical strength, thereby protecting the tempered glass substrate 1 and further improving the impact resistance of the tempered glass substrate 1.

In some embodiments, by setting a thickness of the wear-resistant layer 6 within an appropriate range, it is possible to avoid that the glass backplane 200 is not light and thin enough due to a fact that the overall thickness of the glass backplane 200 is increased due to an excessively large thickness of the wear-resistant layer 6, and it is further possible to avoid that the wear-resistant layer 6 is incapable of effectively protecting the tempered glass substrate 1 due to an excessively small thickness of the wear-resistant layer 6.

For example, the thickness of the wear-resistant layer 6 is greater than or equal to 50 μm, and is less than or equal to 100 μm. In this way, not only is it possible to ensure that the wear-resistant layer 6 is capable of effectively protecting the tempered glass substrate 1, but also it is possible to ensure that the glass backplane 200 is light and thin. For example, the thickness of the wear layer 6 is 60 μm, or the thickness of the wear layer 6 is 80 μm, or the thickness of the wear layer 6 is 100 μm.

In some examples, the thickness of the wear-resistant layer 6 is related to the material of the wear-resistant layer 6. For example, in a case where the material of the wear layer 6 is PET, the thickness of the wear-resistant layer 6 is greater than or equal to 50 μm, and is less than or equal to 100 μm. In this way, not only is it possible to ensure that the wear-resistant layer 6 is capable of effectively protecting the tempered glass substrate 1, but also it is possible to ensure that the glass backplane 200 is light and thin. For example, the thickness of the wear layer 6 is 60 μm, or the thickness of the wear layer 6 is 80 μm, or the thickness of the wear layer 6 is 100 μm.

It will be noted that, in a case where film layers included in the backlight module 200 except the wear-resistant layer 6 are disposed at the second side B of the tempered glass substrate 1, for example, in a case where the light-shielding layer 2 is disposed on the second side B of the tempered glass substrate 1, and the first side A of the light-shielding layer 2 is closer to the tempered glass substrate 1 than the second side B, the wear-resistant layer 6 is disposed on the second side B of the light-shielding layer 2. That is to say, the wear-resistant layer 6 is disposed at the second side B of the tempered glass substrate 1 and is located on an outermost side of the backlight module 200 to protect the tempered glass substrate 1 and other film layers.

In some embodiments, as shown in FIG. 5, the glass backplane 200 further includes an adhesive layer disposed between the light-shielding layer 2 and the reflective layer 7.

For example, in a case where the glass backplane 200 includes the light-shielding layer 2 and the reflective layer 3, the adhesive layer 7 is disposed on the first side A of the light-shielding layer 2 (i.e., a side of the light-shielding layer 2 that is not in contact with the tempered glass substrate 1), so that the adhesive layer 7 enables the light-shielding layer 2 and the reflective layer 3 to be more tightly bonded, thereby avoiding a peeling-off phenomenon caused by an insecure bonding between the light-shielding layer 2 and the reflective layer 3. For example, in the case where the glass backplane 200 further includes the heat-dissipating layer 4, the adhesive layer 7 is disposed on the first side A of the light-shielding layer 2 (i.e., the side of the light-shielding layer 2 that is not in contact with the tempered glass substrate 1), so that the adhesive layer 7 enables the light-shielding layer 2 and the heat-dissipating layer 4 to be tightly bonded, thereby avoiding a peeling-off phenomenon caused by an insecure bonding between the light-shielding layer 2 and the heat-dissipating layer 4.

For example, in a case where the glass backplane 200 further includes the heat-dissipating layer 4 and the destaticizing layer 5, with the destaticizing layer 5 being further away from the tempered glass substrate 1 than the heat-dissipating layer 4, the adhesive layer 7 is disposed on the first side A of the light-shielding layer 2 (i.e., the side of the light-shielding layer 2 that is not in contact with the tempered glass substrate 1), so that the adhesive layer 7 enables the light-shielding layer 2 and the heat-dissipating layer 4 to be tightly bonded, thereby avoiding a peeling-off phenomenon caused by an insecure bonding between the light-shielding layer 2 and the heat-dissipating layer 4. Or, in a case where the glass backplane 200 further includes the heat-dissipating layer 4 and the destaticizing layer 5, with the destaticizing layer 5 being closer to the tempered glass substrate 1 than the heat-dissipating layer 4, the adhesive layer 7 is disposed on the first side A of the light-shielding layer 2 (i.e., the side of the light-shielding layer 2 that is not in contact with the tempered glass substrate 1), so that the adhesive layer 7 enables the light-shielding layer 2 and the destaticizing layer 5 to be tightly bonded, thereby avoiding a peeling-off phenomenon caused by an insecure bonding between the light-shielding layer 2 and the destaticizing layer 5.

In some embodiments, a material of the adhesive layer 7 is not limited, as long as the material is capable of playing an adhesive role. For example, the material of the adhesive layer 7 has high adhesiveness.

In some examples, the material of the adhesive layer 7 is acrylate. Acrylate is widely used as an adhesive due to a strong hydrogen bonding of its ester group. An acrylate adhesive has characteristics such as a high strength, impact resistance, good weather resistance, being capable of be bonded to an oil surface, and the like. The acrylate adhesive has a wide application range, and enables the film layers in the glass backplane 200 to be tightly bonded, and is especially applicable to the case where the material of the light-shielding layer 2 is ink (e.g., the high-temperature ink).

Since the acrylate adhesive has the characteristic of being capable of being binded to the oil surface, the acrylate adhesive enables the light-shielding layer 2 and other film layers to be tightly bonded and not to fall off easily.

In some embodiments, by setting a thickness of the adhesive layer 7 within an appropriate range, it is possible to avoid that the glass backplane 200 is not light and thin enough due to a fact that the overall thickness of the glass backplane 200 is increased due to an excessively large thickness of the adhesive layer 7, and it is further possible to avoid an insufficient bonding by the adhesive layer 7 caused by an excessively small thickness of the adhesive layer 7.

For example, the thickness of the adhesive layer 7 is greater than or equal to 50 μm, and is less than or equal to 100 μm. In this way, not only is it possible to ensure that the adhesive layer 7 effectively plays the adhesive role, but also it is possible to ensure that the glass backplane 200 is light and thin. For example, the thickness of the adhesive layer 7 is 50 μm, or the thickness of the adhesive layer 7 is 70 μm, or the thickness of the adhesive layer 7 is 100 μm.

In some embodiments, the thickness of the adhesive layer 7 is related to the material thereof. For example, in a case where the material of the adhesive layer 7 is acrylate, the thickness of the adhesive layer 7 is greater than or equal to 50 μm, and is less than or equal to 100 μm. In this way, not only is it possible to ensure that the adhesive layer 7 effectively plays the adhesive role, but also it is possible to ensure that the glass backplane 200 is light and thin. For example, the thickness of the adhesive layer 7 is 50 μm, or the thickness of the adhesive layer 7 is 70 μm, or the thickness of the adhesive layer 7 is 100 μm.

The possible positions, functions, materials and thickness ranges of the film layers in the glass backplane 200 are described above, and an overall introduction of the glass backplane 200 will be given below by taking an overall structure of the glass backplane 200 as an example.

In some embodiments, as shown in FIG. 5, the glass backplane 200 includes the wear-resistant layer 6, the tempered glass substrate 1, the light-shielding layer 2, the adhesive layer 7, the heat-dissipating layer 4, the destaticizing layer 5 and the reflective layer 3 that are sequentially stacked. The wear-resistant layer 6 is disposed on the second side B of the tempered glass substrate, and the light-shielding layer 2, the adhesive layer 7, the heat-dissipating layer 4, the destaticizing layer 5 and the reflective layer 3 are sequentially stacked at the first side A of the tempered glass substrate 1. The reflective layer 3 includes the first sub-layer 31 and the second sub-layer 32 that are stacked, with the second sub-layer 32 being closer to the tempered glass substrate 1 than the first sub-layer 31.

On a basis of the above positional relationship among the film layers, the materials and the thicknesses of the film layers are introduced as follows.

For example, the tempered glass substrate 1 is obtained by tempering the glass base. The selected glass base is of the float glass, with a thickness of greater than or equal to 3 mm and less than or equal to 8 mm. For example, the thickness of the glass base is 5 mm.

For example, the material of the light-shielding layer 2 is ink, such as the high-temperature ink, with a thickness of greater than or equal to 29.5 μm and less than or equal to 30.5 μm. For example, the thickness of the light-shielding layer 2 is 30 μm.

For example, the material of the adhesive layer 7 is acrylate, with a thickness of greater than or equal to 50 μm and less than or equal to 100 μm. For example, the thickness of the adhesive layer 7 is 70 μm.

For example, the material of the heat-dissipating layer is graphite, with a thickness of greater than or equal to 50 μm and less than or equal to 100 μm. For example, the thickness of the heat-dissipating layer 4 is 70 μm.

For example, the material of the destaticizing layer 5 is copper, with a thickness of greater than or equal to 2 μm and less than or equal to 6 μm. For example, the thickness of the destaticizing layer 5 is 2 μm.

For example, the material of the second sub-layer 32 included in the reflective layer 3 is PET, with a thickness of greater than or equal to 30 μm and less than or equal to 150 μm. For example, the thickness of the second sub-layer 32 is 70 μm. The first sub-layer 31 included in the reflective layer 3 includes the base and the reflective particles. The material of the base is acrylic resin, and the material of the reflective particles includes titanium dioxide and zinc oxide. The thickness of the first sub-layer 31 is greater than or equal to 50 μm, and is less than or equal to 100 μm. For example, the thickness of the first sub-layer 31 is 70 μm.

For example, the material of the wear-resistant layer 6 is PET, with a thickness of greater than or equal to 50 μm and less than or equal to 100 μm. For example, the thickness of the wear-resistant layer 6 is 70 μm.

As shown in FIG. 6, some embodiments of the present disclosure provide a method of manufacturing a glass base. The method includes: S1 to S4.

In S1, a glass base is provided, and two opposite sides of the glass are a first side and a second side.

It will be noted that, in the above step, the provided glass base is the one processed with a specific size. For example, before the glass base is provided, a piece of glass needs to be selected, and subjected to processes such as cutting, edging, perforating and chamfering according to a required size to obtain the glass base. In some embodiments, the selected glass is float glass, such as low-iron float glass, which has characteristics such as a good optical performance, good flatness, compact structure, being easy to cut, not easy to break and the like, and is an ideal material for manufacturing the glass base. For example, a thickness of the obtained glass base is greater than or equal to 3 mm, and is less than or equal to 8 mm.

In S2, a light-shielding layer 2 is formed on a surface of the first side of the glass base. Two opposite sides of the light-shielding layer 2 are a first side A and a second side B, and the second side B of the light-shielding layer 2 is closer to the glass base than the first side A of the light-shielding layer 2.

In some embodiments, the light-shielding layer 2 is formed on the surface of the first side of the glass base through a screen printing process. For example, a material of the light-shielding layer 2 is ink, such as high-temperature ink. In a case where the material of the light-shielding layer 2 is the high-temperature ink, a thickness of the light-shielding layer 2 is greater than or equal to 29.5 μm, and is less than or equal to 30.5 μm.

In S3, the glass base on which the light-shielding layer 2 is formed is tempered, so as to transform the glass base into a tempered glass substrate 1.

In the above step, for example, a manner of tempering the glass base with the light-shielding layer 2 formed thereon is: placing the glass base with the light-shielding layer 2 formed thereon into a tempering furnace, and heating the glass base to a temperature of 700° C. and for a certain period of time, followed by cooling the glass base by rapidly blowing cold air. In this way, a glass structure of the glass base is changed, a compressive stress is formed on a surface of the glass base, and impact resistance is improved, thereby forming the tempered glass substrate 1. Moreover, in the case where the material of the light-shielding layer 2 is the high-temperature ink, interaction between the high-temperature ink and the glass base is enhanced after the heating and cooling processes in the tempering process, and an adhesive force of the light-shielding layer 2 is improved, thereby making the light-shielding layer 2 be tightly bonded to the tempered glass substrate 1 and not easy to fall off.

In some embodiments, in the steps of tempering the glass base with the light-shielding layer 2 formed thereon, heating time and cooling time are set to be related to the thickness of the glass base, so that it is possible to ensure that the compressive stress on the surface of the glass base is enhanced, and a tempered glass substrate 1 with strong impact resistance is formed. For example, in a case where the thickness of the glass base is greater than or equal to 3 mm, and is less than or equal to 5 mm, the time for which the glass base with the light-shielding layer 2 formed thereon is heated at the temperature of 700° C. is in a range of 200 s to 240 s, and the cooling time is in a range of 120 s to 150 s. In a case where the thickness of the glass base is greater than or equal to 6 mm, and is less than or equal to 8 mm, the time for which the glass base with the light-shielding layer 2 formed thereon is heated at the temperature of 700° C. is in a range of 450 s to 480 s, and the cooling time is in a range of 300 s to 330 s.

In S4, a reflective layer 3 is formed at the first side A of the light-shielding layer 2.

Figure 7A:
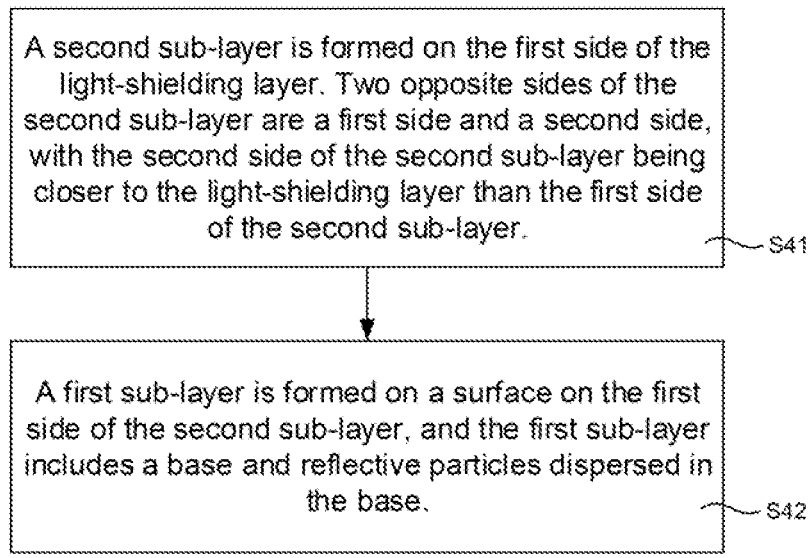
FIG. 7A is another flow diagram of a method of manufacturing a glass backplane, in accordance with some embodiments of the present disclosure.
Figure 7B:
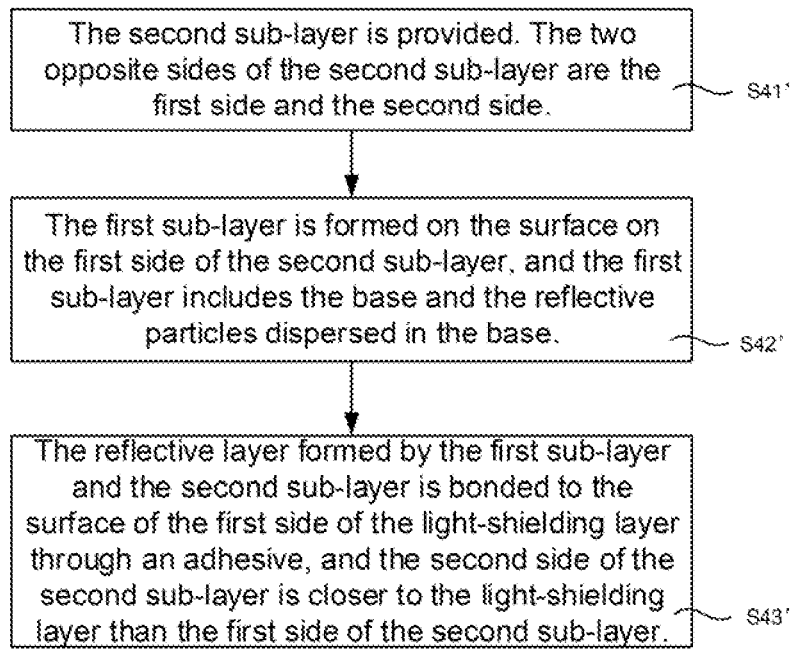
FIG. 7B is yet another flow diagram of a method of manufacturing a glass backplane, in accordance with some embodiments of the present disclosure.

In some embodiments, as shown in FIG. 7A, S4 includes S41 and S42.

In S41, a second sub-layer 32 is formed on the first side A of the light-shielding layer 2. Two opposite sides of the second sub-layer 32 are a first side A and a second side B, and the second side B of the second sub-layer 32 is closer to the light-shielding layer 2 than the first side A of the second sub-layer 32.

For example, the second sub-layer 32 is formed on a surface of the first side A of the light-shielding layer 2 through a deposition process.

In some examples, a material of the second sub-layer 32 is polyethylene glycol terephthalate (PET), with a thickness of greater than or equal to 30 μm and less than or equal to 150 μm. For example, the thickness of the second sub-layer 32 is 70 μm.

In S42, a first sub-layer 31 is formed on a surface of the first side A of the second sub-layer 32, and the first sub-layer 31 includes a base and reflective particles dispersed in the base.

For example, the first sub-layer 31 is formed on the surface of the first side A of the second sub-layer 32 through a deposition process. As a possible implementation, the reflective particles are dispersed in the base to form a mixture of the reflective particles and the base before the deposition process, and then the mixture of the reflective particles and the base is deposited on the surface of the first side A of the second sub-layer 32 through the deposition process to form the first sub-layer 31.

In some examples, a material of the base in the first sub-layer 31 includes at least one of acrylic resin, polymethyl methacrylate and PET. A material of the reflective particles in the first sub-layer 31 includes at least one of titanium dioxide, zinc oxide and zirconium oxide. A thickness of the first sub-layer 31 is greater than or equal to 50 μm, and is less than or equal to 100 μm. For example, the thickness of the first sub-layer 31 is 70 μm.

In some other embodiments, as shown in FIG. 78, S4 includes S41' to S43'.

In S41', the second sub-layer 32 is provided. The two opposite sides of the second sub-layer 32 are the first side A and the second side B.

In some examples, the material of the second sub-layer 32 is PET, with a thickness of greater than or equal to 50 μm and less than or equal to 100 μm. For example, the thickness of the second sub-layer 32 is 70 μm.

In S42', the first sub-layer 31 is formed on the surface of the first side A of the second sub-layer 32, and the first sub-layer 31 includes the base and the reflective particles dispersed in the base.

As a possible implementation, the reflective particles are dispersed in the base to form the mixture of the reflective particles and the base, and then the mixture of the reflective particles and the base is coated on the surface of the first side A of the second sub-layer 32 to form the first sub-layer 31.

In S43', the reflective layer composed of the first sub-layer 31 and the second sub-layer 32 is bonded to the surface of the first side A of the light-shielding layer 2 through an adhesive, with the second side B of the second sub-layer 32 being closer to the light-shielding layer 2 than the first side A of the second sub-layer 32.

For example, with the adhesive being coated on a surface of the second side B of the second sub-layer 32 to form an adhesive layer 7, the reflective layer 3 composed of the first sub-layer 31 and the second sub-layer 32 can be bonded to the surface of the first side A of the light-shielding layer 2 through the adhesive layer 7. Or, with the adhesive being coated on the surface of the first side A of the light-shielding layer 2 to form the adhesive layer 7, the second side B of the second sub-layer 32 can be bonded to the surface of the first side A of the light-shielding layer 2 through the adhesive layer 7.

It will be noted that, for a preparing manner in which the reflective layer 3 being bonded to the surface of the first side A of the light-shielding layer 2 through the adhesive in S41' to S43', S41' to S42' (i.e., the steps of preparing the reflective layer 3) may be performed simultaneously with S1 to S3 (i.e., the steps of preparing the light-shielding layer 2 on the glass base and tempering the glass base), and then the prepared reflective layer 3 is bonded to the surface of the first side A of the light-shielding layer 2, which may improve manufacturing efficiency and save time.

In some embodiments, the method of manufacturing the glass backplane further includes: cleaning the surface of the glass base before S2.

For example, the surface of the glass base is brushed in a rolling manner to remove debris on the surface, and is ultrasonically cleaned by sequentially using cleaning agents such as acetone, isopropanol and deionized water for 10 min to 15 min, and then hot air is blown to the surface of the glass base to dry the surface of the glass base.

In some embodiments, the method of manufacturing the glass backplane further includes steps of forming a heat-dissipating layer 4, a destaticizing layer 5 and a wear-resistant layer 6, all of which can be formed by using the deposition process, and a sequence of forming the film layers is determined according to actual situations, and is not limed in the present disclosure.

An overall introduction of an embodiment of the method of manufacturing the glass backplane will be given below with the glass backplane 200 shown in FIG. 5 as an example.

In S1, the glass base is provided.

In S2, the light-shielding layer 2 is formed on the surface of the first side of the glass base. The two opposite sides of the light-shielding layer 2 are the first side A and the second side B, with the second side B of the light-shielding layer 2 being closer to the glass base than the first side A of the light-shielding layer 2.

In S3, the glass base with the light-shielding layer 2 formed thereon is tempered, so as to transform the glass base into the tempered glass substrate 1. Two opposite sides of the tempered glass substrate 1 are a first side A and a second side B, with the second side B of the light-shielding layer 2 being closer to the tempered glass substrate 1 than the first side A of the light-shielding layer 2.

As for a specific introduction of S1 to S3, reference may be made to the above description.

In S41', the second sub-layer 32 is provided. The two opposite sides of the second sub-layer 32 are the first side A and the second side B.

In S42', the first sub-layer 31 is formed on the surface of the first side A of the second sub-layer 32, and the first sub-layer 31 includes the base and the reflective particles dispersed in the base.

As for a specific introduction of S41' and S42', reference may be made to the above description.

In S421', the destaticizing layer 5 is formed on the surface of the second side B of the second sub-layer 32.

For example, the destaticizing layer 5 is formed on the surface of the second side B of the second sub-layer 32 through the deposition process.

In some examples, a material of the destaticizing layer 5 is a metal such as copper, with a thickness of greater than or equal to 2 μm and less than or equal to 6 μm. For example, the thickness of the destaticizing layer 5 is 2 μm.

In S422', the heat-dissipating layer 4 is formed on a surface of aside (i.e., a first side A) of the destaticizing layer 5 away from the first sub-layer 31.

For example, the heat-dissipating layer 4 is formed on the surface of the side of the destaticizing layer 5 away from the first sub-layer 31 through the deposition process.

For example, a material of the heat-dissipating layer 4 includes at least one of graphite, copper, aluminum and silver. For example, the material of the heat-dissipating layer is graphite. A thickness of the heat-dissipating layer 4 is greater than or equal to 50 μm, and is less than or equal to 100 μm. For example, the thickness of the heat-dissipating layer 4 is 70 μm.

It will be noted that, S1 to S3 and S41' to S422' are two separate manufacturing processes. In some embodiments, S1 to S3 and S41' to S422' are performed simultaneously, which may improve the manufacturing efficiency of the glass backplane.

In S43', a stacked structure formed by the reflective layer 3 composed of the first sub-layer 31 and the second sub-layer 32, the destaticizing layer 5 and the heat-dissipating layer 4 is bonded to the surface of the first side A of the light-shielding layer 2 through the adhesive.

In the above steps, for example, the adhesive is coated on the surface of the first side A of the light-shielding layer 2 to form the adhesive layer 7, and then the stacked structure formed by the reflective layer 3, the destaticizing layer 5 and the heat-dissipating layer 4 is transferred onto the adhesive layer 7, with the heat-dissipating layer 4 being in contact with the adhesive layer 7, thereby bonding the stacked structure to the surface of the first side A of the light-shielding layer 2 through the adhesive.

For example, a material of the adhesive layer 7 is acrylate, with a thickness of greater than or equal to 50 μm and less than or equal to 100 μm. For example, the thickness of the adhesive layer 7 is 70 μm.

In S5, the wear-resistant layer 6 is formed on a surface of the second side B of the tempered glass substrate 1.

For example, the wear-resistant layer 6 is formed on the surface of the second side B of the second sub-layer 32 through the deposition process.

For example, the material of the wear-resistant layer 6 is PET, with a thickness of greater than or equal to 50 μm and less than or equal to 100 μm. For example, the thickness of the wear layer 6 is 70 μm.

The glass backplane 200 shown in FIG. 5 is manufactured through the above method of manufacturing the glass backplane.

For example, a thickness of each film layer mentioned in some embodiments of the present disclosure refers to an average of thicknesses at respective positions of the film layer in a direction perpendicular to a plane where the film layer is located. Or, the thickness of each film layer mentioned in some embodiments of the present disclosure refers to a maximum thickness or a minimum thickness in the thicknesses at respective positions of the film layer in the direction perpendicular to the plane where the film layer is located.

Some embodiments of the present disclosure provide a backlight module including the glass backplane 200 provided in some embodiments of the present disclosure. For convenience of description, taking the glass backplane 200 shown in FIGS. 2A to 5 as an example, a surface of the glass backplane 200 provided with the reflective layer 3 is referred to as a backlight surface, and another surface thereof is referred to as a design surface. In a case where the backlight module is applied to a display device, the backlight surface of the glass backplane 200 is configured to face the display panel.

Figure 8A:
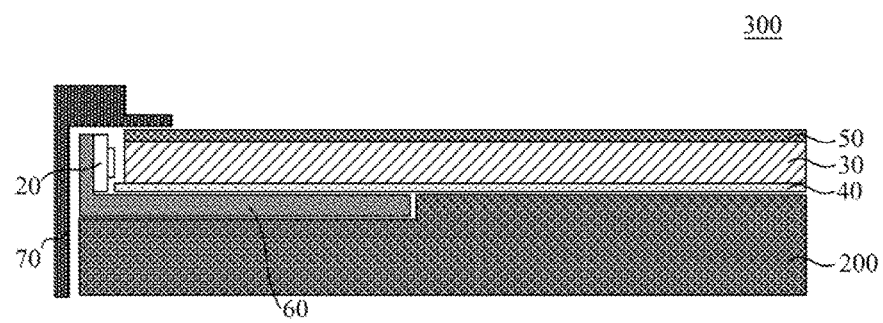
FIG. 8A is a diagram showing a structure of a backlight module, in accordance with some embodiments of the present disclosure.

In some embodiments, as shown in FIG. 8A, the backlight module is a side-type backlight module 300, which includes a glass backplane 200, a light source 20, a light guide plate 30, a reflective sheet 40, an optical film 50, a heat-dissipating plate 60 and a frame 70.

The light source 20 is disposed at an end of the light guide plate 30 and is configured to emit light to provide the light to the display panel. The reflective sheet 40 is disposed at the backlight side of the glass backplane 200, and is configured to reflect the light. The light guide plate 30 is disposed on a side of the reflective sheet 40 facing away from the glass backplane 200, and is configured to convert the light emitted by the light source 20 into a surface light source. The optical film 50 (e.g., the optical film 50 including a diffusion sheet, a prism sheet and a brightness enhancement sheet) is disposed on a side of the light guide plate 30 facing away from the glass backplane 200, and functions to homogenize light and converge large-angle light for a front observation. The heat-dissipating plate 60 is disposed at a side of the light source 20, and is configured to dissipate heat. The frame 70 is disposed on a periphery of the backlight module, and is configured to fix the components included in the backlight module.

A process of providing light by the side-type backlight module 300 is roughly as follows. The light source 20 emits light, and then the light enters an interior of the light guide plate 30 from an end of the light guide plate 30, and is guided to an opposite end of the light guide plate 30 from the end of the light guide plate 30 after the light is totally reflected, refracted, scattered, or reflected in the interior of the light guide plate 30. Then, the light exits uniformly from a side of the light guide plate 30 facing away from the glass backplane 200, and is directed to the optical film 50. Finally, the light passes through the optical film 50 and exits to provide required backlight for the display panel after being homogenized and converged by the optical film 50. In the above working process, the heat-dissipating plate 60 functions to dissipate heat, so as to prevent excessive heat generated by the light source 20 in a light-emitting process from affecting normal operations of the side-type backlight module 300.

In the side-type backlight module 300, the backplane 200 is configured to support and protect the light guide plate 30. In a case where no reflective sheet 40 is disposed between the backplane 200 and the light guide plate 30, the backplane 200 may further have a reflective function, i.e., re-reflect light emitted from a side of the light guide plate 30 facing the backplane 200 back to the interior of the light guide plate 30.

Figure 8B:
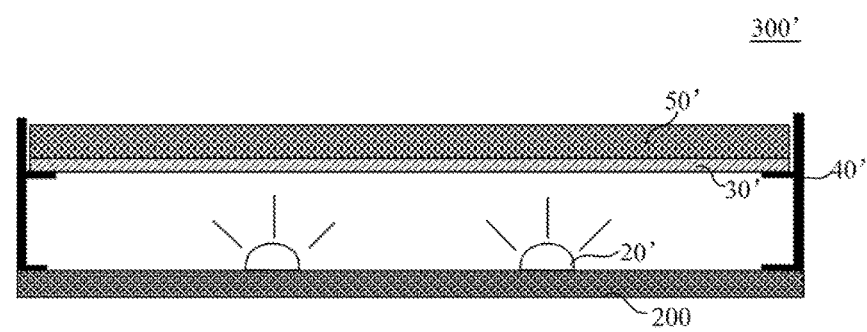
FIG. 8B is a diagram showing a structure of another backlight module, in accordance with some embodiments of the present disclosure.

In some other embodiments, the backlight module is a direct-type backlight module. Referring to FIG. 8B, the direct-type backlight module 300' includes a glass backplane 200, a light source 20', a diffusion plate 30', a frame 40' and an optical film 50'.

The light source 20' is disposed on a backlight side of the glass backplane 200 and is configured to provide light. Under support of the frame 40', there is a certain distance between the diffusion plate 30' and the glass backplane 200. For example, the distance is a light-mixing distance, and the diffusion plate 30', the glass backplane 200 and the frame 40' together form a chamber. For example, the chamber is a light-mixing chamber for mixing light. The diffusion plate 30' is configured to uniformly disperse light. The optical film 50' (e.g., the optical film 50' including a prism sheet and a brightness enhancement sheet) is disposed on a side of the diffusion plate 30' facing away from the glass backplane 200, and is configured to enhance brightness of emitted light.

A working process of the direct-type backlight module 300' described above is as follows. The light source 20' emits light, and the light is mixed in the light-mixing chamber. A part of the light directly enters the diffusion plate 30', and a part of the light entering the backplane 200 enters the diffusion plate 30' after being reflected by the backplane 200. Then, the light enters the optical film 50' from the diffusion plate 30' after being uniformly dispersed by the diffusion plate 30'. Finally, the light passes through the optical film 50' and is directed to an exterior of the direct-type backlight module 100 to provide light with high uniformity and high luminance for the display panel after being homogenized and converged by the optical film 50'.

In the direct-type backlight module 300', the glass backplane 200 is configured to support and protect the light source 20'. The glass backplane 200' further has a reflective function, i.e., reflects light emitted by the light source 20' and directed to the backplane 10' to the diffusion plate 30'.

In the side-type backlight module 300 and the direct-type backlight module 300' described above, the glass backplane 200 further has strong deformation resistance, low light transmittance and certain light reflection performance with advantages of being good in flatness, good weather resistance, not easy to expand and deform, light and thin, free of the mold opening and the like. Therefore, an overall flatness of the backlight module may be improved, with a reduced overall thickness, less difficulty in a manufacturing process, saved costs and improved deformation resistance of the backlight module. Moreover, since the glass backplane 200 provided in the present disclosure overcomes disadvantages of fragility and light transmission of glass, the glass backplane may be widely applied to the backlight module.

Figure 9:
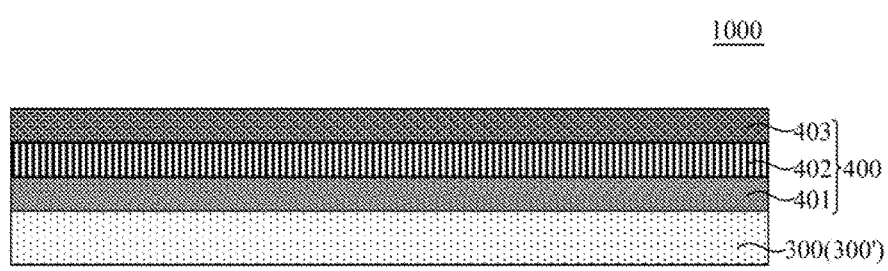
FIG. 9 is a diagram showing a structure of a display apparatus, in accordance with some embodiments of the present disclosure.

As shown in FIG. 9, some embodiments of the present disclosure further provide a display apparatus 1000 including the backlight module provided in some embodiments of the present disclosure (the side-type backlight module 300 or the direct-type backlight module 300'), and a display panel 400 stacked with the backlight module and disposed on a light-emitting side of the backlight module 300 (300').

In some embodiments, the display panel 400 mentioned above includes an array substrate 401 and an opposite substrate 403 that are disposed opposite to each other, and a liquid crystal layer 402 disposed between the array substrate 401 and the opposite substrate 403.

For example, a working process of the display apparatus is as follows. The backlight module 300 (300')) provides a backlight, light is irradiated onto the display panel 400, and meanwhile liquid crystal molecules in the liquid crystal layer 402 are deflected under action of a voltage to control whether the light is emitted from a front surface of the display panel in which a deflected degree of the liquid crystal molecules is related to a magnitude of the applied voltage, thereby controlling intensity of the light emitted from the front surface of the display panel. Each pixel on an entire display panel may determine the intensity of the emitted light separately, thereby generating an image.

The display apparatus 1000 provided in the embodiments of the present disclosure includes the backlight module provided in the embodiments of the present disclosure. Therefore, the display apparatus has good performance, an aesthetic appearance, a light and thin body, and has same technical effects as the backlight module. For example, an overall thickness of the display apparatus 1000 may be within 10 mm.

In some examples, the display apparatus may be a fringe field switching (FFS) liquid crystal display apparatus, an in-plane switching (IPS) liquid crystal display apparatus, or an advanced super dimension switch (ADS) liquid crystal display apparatus.

In addition, the display apparatus is a product with a display function such as a television, a cellphone, a tablet computer, a notebook computer, a display, a digital photo frame or a navigator, which is not limited in the present disclosure.

The forgoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A glass backplane, comprising:
a tempered glass substrate, two opposite sides of the tempered glass substrate being a first side and a second side;
a light-shielding layer disposed on a surface of the first side of the tempered glass substrate, two opposite sides of the light-shielding layer being a first side and a second side, and the second side of the light-shielding layer being closer to the tempered glass substrate than the first side of the light-shielding layer;
a reflective layer disposed at the first side of the light-shielding layer; and
a heat-dissipating layer and a destaticizing layer disposed between the light-shielding layer and the reflective layer, wherein the destaticizing layer is disposed on a surface of the first side of the light-shielding layer, the heat-dissipating layer is disposed on a side of the destaticizing layer away from the light-shielding layer, a material of the heat-dissipating layer includes at least one of graphite, copper, aluminum and silver, and a material of the destaticizing layer is a metal;
wherein the reflective layer includes a first sub-layer and a second sub-layer that are stacked, and the second sub-layer is closer to the light-shielding layer than the first sub-layer;
the first sub-layer includes a base and reflective particles dispersed in the base, a material of the base includes at least one of acrylic resin and polymethyl methacrylate, and a material of the reflective particles includes at least one of titanium dioxide, zinc oxide and zirconium oxide; and
a material of the second sub-layer is polyethylene glycol terephthalate.

2. The glass backplane according to claim 1, wherein a material of the light-shielding layer is ink.

3. The glass backplane according to claim 1, further comprising a wear-resistant layer disposed on the second side of the tempered glass substrate.

4. The glass backplane according to claim 3, wherein a material of the wear-resistant layer is polyethylene glycol terephthalate.

5. The glass backplane according to claim 1, further comprising an adhesive layer disposed between the light-shielding layer and the reflective layer.

6. The glass backplane according to claim 1, wherein a thickness of the light-shielding layer is greater than or equal to 29.5 μm, and is less than or equal to 30.5 μm.

7. A method of manufacturing a glass backplane, the method comprising:
providing a glass base, two opposite sides of the glass base being a first side and a second side;
forming a light-shielding layer on a surface of the first side of the glass base, two opposite sides of the light-shielding layer being a first side and a second side, and the second side of the light-shielding layer being closer to the glass base than the first side of the light-shielding layer;
tempering the glass base with the light-shielding layer formed thereon, so as to transform the glass base into a tempered glass substrate;
forming a heat-dissipating layer and a destaticizing layer at the first side of the light-shielding layer, the destaticizing layer being disposed on a surface of the first side of the light-shielding layer, the heat-dissipating layer being disposed on a side of the destaticizing layer away from the light-shielding layer, a material of the heat-dissipating layer including at least one of graphite, copper, aluminum and silver, and a material of the destaticizing layer being a metal; and
forming a reflective layer at a side of the heat-dissipating layer and the destaticizing layer away from the light-shielding layer;
wherein a step of forming the reflective layer at the side of the heat-dissipating layer and the destaticizing layer away from the light-shielding layer includes:
forming a second sub-layer at the side of the heat-dissipating layer and the destaticizing layer away from the light-shielding layer, two opposite sides of the second sub-layer being a first side and a second side, the second side of the second sub-layer being closer to the light-shielding layer than the first side of the second sub-layer, and a material of the second sub-layer being polyethylene glycol terephthalate; and forming a first sub-layer on a surface of the first side of the second sub-layer, the first sub-layer including a base and reflective particles dispersed in the base, a material of the base including at least one of acrylic resin and polymethyl methacrylate, and a material of the reflective particles including at least one of titanium dioxide, zinc oxide and zirconium oxide; or wherein a step of forming the reflective layer at the side of the heat-dissipating layer and the destaticizing layer away from the light-shielding layer includes:

providing a second sub-layer, two opposite sides of the second sub-layer being a first side and a second side, and a material of the second sub-layer being polyethylene glycol terephthalate;

forming a first sub-layer on a surface of the first side of the second sub-layer, the first sub-layer including a base and reflective particles dispersed in the base, a material of the base including at least one of acrylic resin and polymethyl methacrylate, and a material of the reflective particles including at least one of titanium dioxide, zinc oxide and zirconium oxide; and bonding the reflective layer composed of the first sub-layer and the second sub-layer to a surface of the side of the heat-dissipating layer and the destaticizing layer away from the light-shielding layer through an adhesive, the second side of the second sub-layer being closer to the light-shielding layer than the first side of the second sub-layer.

8. A display apparatus, comprising the glass backplane according to claim 1.

* * * * *

UNITED STATES PATENT AND TRADEMARK OFFICE
CERTIFICATE OF CORRECTION

| | | Page 1 of 1 |
|---|---|---|
| PATENT NO. | : 12,235,531 B2 | |
| APPLICATION NO. | : 16/982030 | |
| DATED | : February 25, 2025 | |
| INVENTOR(S) | : Hailong Dai and Yanan Zhang | |

It is certified that error appears in the above-identified patent and that said Letters Patent is hereby corrected as shown below:

In the Specification

In Column 3, Line 1, delete "18" and insert --1B--

Signed and Sealed this
Twelfth Day of August, 2025

Coke Morgan Stewart
*Acting Director of the United States Patent and Trademark Office*